Jan. 6, 1942.  P. KÖHLER  2,269,100
REFRIGERATION
Filed Dec. 15, 1936  2 Sheets-Sheet 1

INVENTOR.
Peter Köhler
BY
E. A. Fenander
his ATTORNEY.

Patented Jan. 6, 1942

2,269,100

UNITED STATES PATENT OFFICE 2,269,100

REFRIGERATION

Peter Köhler, Stockholm, Sweden, assignor, by mesne assignments, to Servel, Inc., New York, N. Y., a corporation of Delaware Application December 15, 1936, Serial No. 115,907 In Germany January 7, 1936

24 Claims. (Cl. 62—5)

My invention relates to refrigeration, and more particularly to control of absorption refrigeration apparatus operated by an available source of heat.

In employing an available heat source to operate absorption refrigeration apparatus, it is highly desirable to provide suitable control to accurately maintain the storage space of a refrigerator at a predetermined or desired temperature under all operating conditions. It is particularly desirable to control the apparatus providing a high temperature region which is utilized as the heat source, so that changes in conditions affecting the operation of the apparatus and hence the temperature of the heat source are not imposed upon the control of the refrigerator. If changes in operating conditions of the apparatus should cause the high temperature region to exceed a predetermined high value, for example, undesirable overheating of the part of the refrigeration apparatus to which heat is transmitted may take place. Further, when a heat transfer system containing a fluid for transferring heat is utilized, overheating may produce an excessive pressure in the heat transfer system.

In accordance with my invention it is proposed not only to control the transmission of heat from the heat source to the refrigeration apparatus to maintain the storage space at a desired low temperature, but it is also proposed to regulate the apparatus providing a high temperature region utilized as the heat source, so that the temperature of the latter will be substantially constant and not exceed a predetermined safe value. I accomplish this by independently regulating the temperature of the storage space and the temperature of the heat source whereby one supplements the other irrespective of the varying factors or conditions encountered, thereby obtaining an effective and safe control which is capable of maintaining the enclosed space at a desired low temperature.

The novel features which I believe to be characteristic of my invention are set forth with particularity in the claims. The invention itself, however, both as to organization and method, together with the objects and advantages thereof, will be better understood by reference to the following description taken in connection with the accompanying drawings in which Fig. 1 diagrammatically illustrates apparatus embodying my invention for transferring heat from a continuous burning stove to absorption refrigeration apparatus; and Fig. 2 is a modification of the embodiment shown in Fig. 1.

Figure 1:
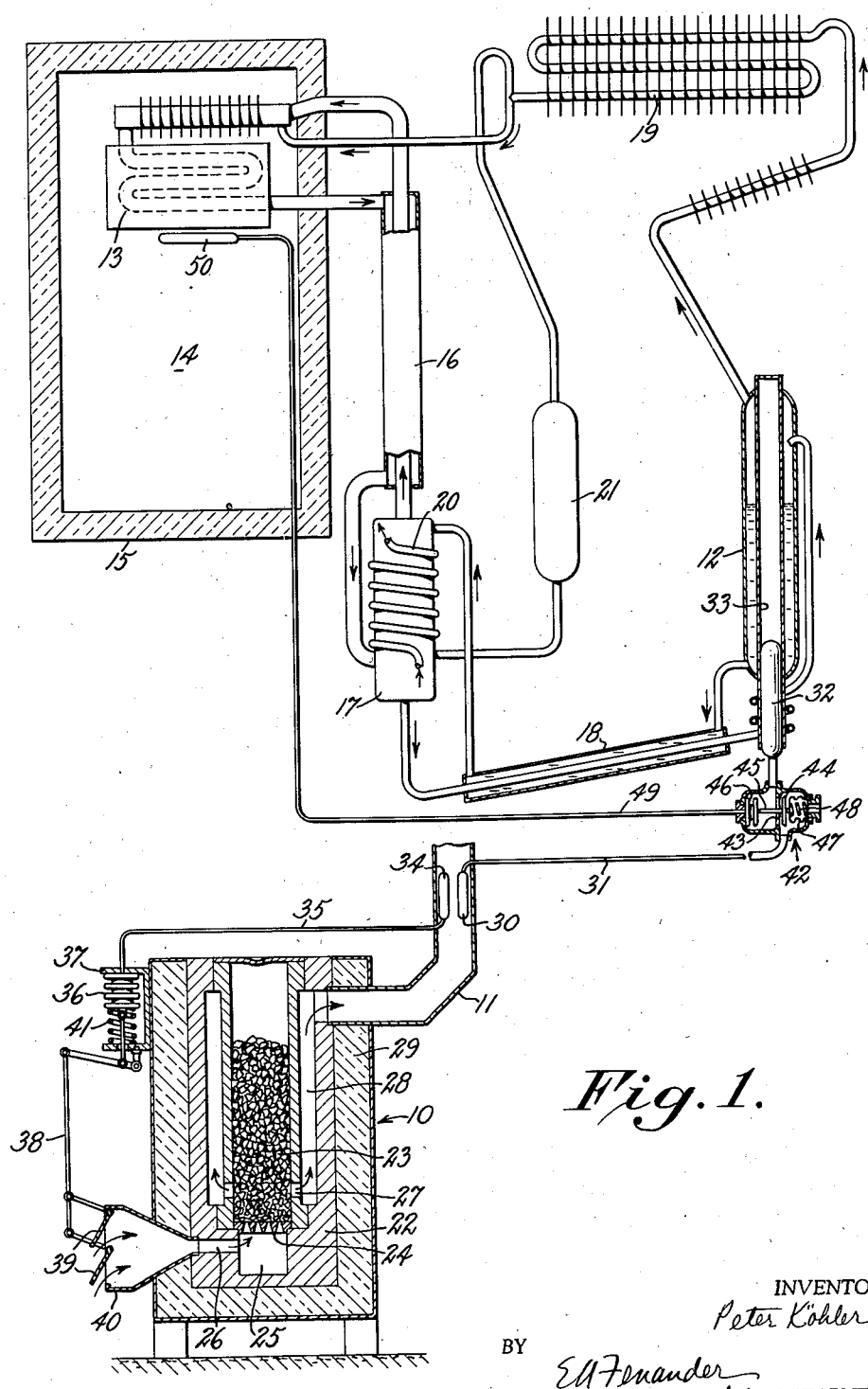
Figure 2:
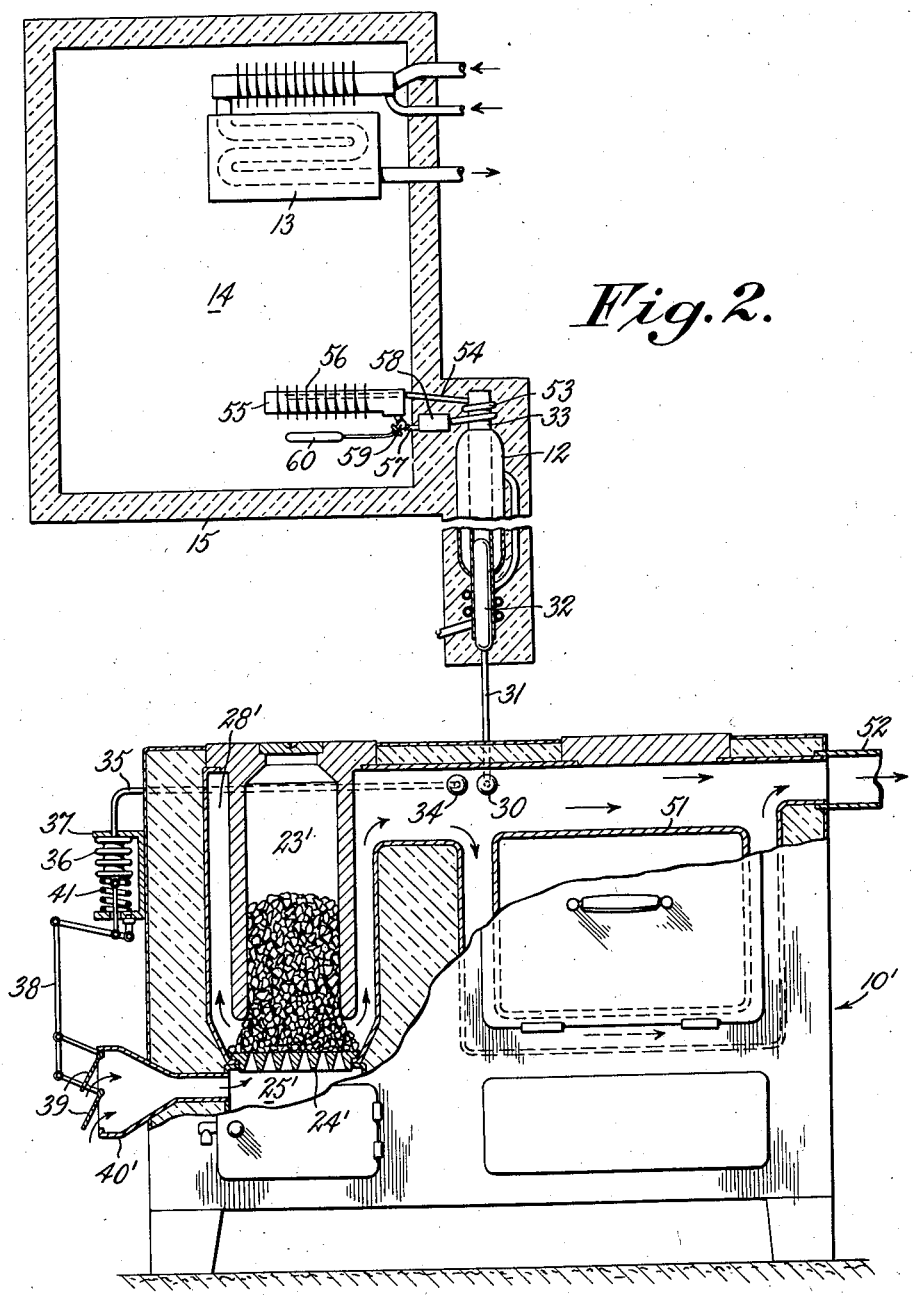

Referring to Fig. 1, I have shown my invention in connection with a stove 10 in which the heat of the combustion gases discharged therefrom through a pipe 11 is transferred to a generator 12 of absorption refrigeration apparatus. The refrigeration apparatus I have shown is of a uniform pressure absorption type, generally as described in Patent No. 1,609,334 to von Platen and Munters, in which an auxiliary pressure equalizing gas is employed. It is to be understood, however, that my invention can be employed with other types of refrigeration apparatus operated by heat.

The refrigeration apparatus includes a cooling element or evaporator 13 disposed in an enclosed space 14 which may form a food storage compartment of a thermally insulated refrigerator cabinet 15. The refrigerant fluid, such as ammonia, evaporates in the evaporator 13 and diffuses into an inert gas, such as hydrogen, with consequent absorption of heat from the surroundings. The resulting gaseous mixture of refrigerant and hydrogen flows from the lower section of the evaporator 13 through a gas heat exchanger 16 into an absorber 17 in which the refrigerant gas is absorbed by a suitable liquid absorbent, such as water. The inert hydrogen gas is returned to the upper section of the evaporator 13 through the gas heat exchanger 16, and the enriched absorption liquid is conducted through a liquid heat exchanger 18 to the generator 12.

By heating the generator 12 the refrigerant is expelled from the absorption liquid, liquefied in an air-cooled condenser 19, and then returned to the evaporator 13 to complete the refrigerating cycle. The weakened absorption liquid from which the refrigerant has been expelled is conducted from the generator 12 through the liquid heat exchanger 18 into the absorber 17 to absorb refrigerant gas, the absorber being provided with a coil 20 through which a suitable cooling medium is circulated. A vessel 21 is connected to the lower end of the condenser 19 and to the gas circuit, as at the absorber 17, for example, so that any hydrogen which may pass through the condenser can flow to the gas circuit and not be trapped in the condenser. If ammonia is not liquefied in the condenser 19 due to an increase in air temperature, the ammonia vapor will flow into the vessel 21 and force hydrogen into the gas circuit, thereby raising the total pressure in the system so that an adequate condensing pressure is obtained for the increased air temperature.

The stove 10 comprises a metal block 22 having a chamber 23 adapted to receive coal or other suitable solid fuel. The fuel is supported on a grate 24 below which is formed an ash pit 25 which communicates with a passage 26 that extends to the exterior of the stove to admit combustion air. The combustion gases formed in the chamber 23 pass through openings 27 into a vertical channel 28 from which the gases are discharged through the pipe 11. The metal block 22 is insulated in any suitable manner, as indicated at 29, to protect the stove against excessive loss of heat.

The heat tranfer system for transferring heat of the combustion gases of the stove 10 to the refrigeration apparatus includes an evaporation member 30 which is disposed in the pipe 11 and adapted to be heated by the combustion gases. The evaporation member 30 is connected to a conduit 31 which is connected at its upper end to a condenser member 32 disposed within the lower end of a sleeve 33 that extends upward through the generator 12 and is closed at its upper end. The evaporation member 30, condenser 32, and connecting conduit 31 form a hermetically sealed circuit adapted to contain a suitable fluid, such as, for example, diamyl, pyridine, or diphenyl.

When the stove 10 is being operated, the liquid in the member 30 is evaporated due to the high temperature of the combustion gases discharged through the pipe 11. The vapor passes upward through conduit 31 into the member 32 in which it is condensed, and the condensate flows downward through conduit 31 and returns to the evaporation member 30. In the evaporation-condensation circuit that has been provided, therefore, the fluid serves as a heat transfer agent which circulates naturally in the closed fluid system. The evaporation of the liquid in the member 30 takes up heat from the combustion gases, and the condensation of the vapor in the member 32 gives up heat to the generator 12 and its contents to expel refrigerant out of solution from the absorption liquid, whereby refrigeration is produced in the storage space 14 to maintain the latter at a low temperature.

In accordance with my invention I provide a suitable control for maintaining the combustion gases in the region of the evaporation member 30 at a substantially constant temperature. This control comprises an expansible fluid thermostat including a thermal element 34, a capillary tube 35, and an expansible bellows 36 which is fixed to a bracket 37 supported on the stove 10. The bellows 36, through suitable linkage 38 is adapted to operate dampers 39 fixed to the outer end of a conical-shaped inlet pipe 40 which is connected to the passage 26 formed in the metal block 22.

The thermal bulb 34, tube 35, and bellows 36 contain a suitable volatile fluid which increases and decreases in volume with corresponding changes of temperature. When the combustion gases in the region of the evaporation member 30 tend to increase above a predetermined temperature, the volatile fluid increases in volume and causes the bellows 36 to expand whereby the linkage 38 moves the dampers 39 toward their closed position to reduce the quantity of combustion air admitted into the stove, thereby decreasing the temperature of the combustion gases; and, conversely, when the combustion gases in the region of the evaporation member 30 tend to decrease below the predetermined temperature, the volatile fluid becomes reduced in volume and a spring 41 becomes effective to contract the bellows 36 whereby the linkage 38 moves the dampers 39 away from their closed position to increase the quantity of combustion air admitted into the stove, thereby increasing the temperature of the combustion gases.

In addition to controlling the temperature of the combustion gases in the pipe 11 and hence the temperature of the heat source, I also provide means for controlling the heat transmitted to the generator 12 of the refrigeration apparatus. Referring to Fig. 1, this may be accomplished by providing in the conduit 31 of the heat transfer system a hermetically sealed valve 42 which is connected to be responsive to a temperature condition affected by the cooling element 13. The valve 42 comprises a casing having an opening 43 which is controlled by a valve member 44. The valve member 44 is fixed to a stem 45 which is connected to two bellows 46 and 47. Within the bellows 47 is disposed a spring 48 which urges the valve member 44 to its closed position. The bellows 46 is connected to a capillary tube 49 which is connected at its upper end to a thermal element 50 arranged in the storage space 14 adjacent to the cooling element 13. The thermal element 50, tube 49, and bellows 46 also constitute an expansible fluid thermostat containing a fluid which increases and decreases in volume with corresponding changes of temperature.

When the temperature in the storage space 14 tends to decrease below a desired low temperature, the volatile fluid becomes reduced in volume whereby the bellows 46 contracts and the bellows 47 and spring 48 are effective to urge the valve member 44 to its closed position. This reduces the quantity of vapor passing upward through the conduit 31 from the evaporation member 30 into the condenser 32, so that less heat is transmitted to the generator 12 from the stove 10 and the refrigerating effect produced by the cooling element 13 is reduced. When the temperature of the storage space 14 tends to increase above the desired low temperature, the volatile fluid increases in volume and causes the bellows 46 to expand and move the valve member 44 away from the opening 43, so that a greater quantity of heat is transmitted to the generator 12 from the stove 10. With more heat applied to the generator 12, an increased quantity of refrigerant is expelled out of absorption liquid and the refrigerating effect produced by the cooling element 13 is increased.

Instead of controlling the heat transmitted to the refrigeration apparatus by a hermetically sealed valve in the heat transfer system, such as the valve 42, and regulating the valve in response to the temperature of the storage space, the heat transmitted to the refrigeration apparatus may be utilized to heat the storage space 14 when the latter tends to fall below a desired low temperature. Such a modification is shown in Fig. 2 in which parts of the refrigeration apparatus are omitted and the parts similar to those shown in Fig. 1 are designated by the same reference numerals.

In Fig. 2 I have shown a cooking stove 10' having a chamber 23' in the left-hand part adapted to receive a solid fuel such as coal. The combustion air is admitted through the inlet element 50 regulates the heat transmitted from the stove 10 and in Fig. 2 the thermostatic valve 59 of the second vaporization-condensation member regulates the heat transmitted from the stove 10' to maintain the storage space 14 at a desired low temperature. By providing two thermostats for independently regulating the temperature of the storage space 14 and the high temperature region utilized as the heat source, the different conditions affecting the operation of the stove 10 or 10' and the refrigerator are segregated. Thus, by controlling the apparatus providing the high temperature region, the thermal element 50 in Fig. 1 or thermal element 60 in Fig. 2 controls the heat transmitted to the generator 12 in response only to conditions affecting the operation of the refrigerator. For example, at the stove 10 or 10' one operating condition encountered is the heat loss from the stove whereas at the refrigerator an entirely operating condition encountered is the heat leakage into the storage space. The heat leakage into the storage space 14 increases with a rise of temperature of outside air while the heat loss from the stove 10 or 10' decreases with such change of temperature of outside air. The temperatures of the heat source and the storage space, therefore, tend to change independently of each other with changes of temperature of the outside air. By maintaining the temperature of the available heat source substantially constant, changes in conditions affecting the operation of the stove 10 or 10' are not imposed upon the thermostat which regulates the heat transmitted to the refrigeration apparatus, so that an extremely sensitive and accurate control of the temperature in the storage space 14 is effected.

While I have shown and described particular embodiments of my invention, such variations and modifications are contemplated as fall within the true spirit and scope of my invention, as pointed out in the following claims.

What is claimed is:

1. In a refrigerator having a thermally insulated storage space and absorption refrigeration apparatus including a cooling element arranged to effect cooling of said space and a generator, heating means removed from said generator and providing a region of high temperature, means comprising a vaporization-condensation member adapted to contain a fluid and having a vaporization portion in said region of high temperature and a condenser portion in thermal relation with said generator, means including a thermal element disposed in said region of high temperature and adjacent to the vaporization portion of said vaporization-condensation member for controlling said heating means to maintain said region substantially at a constant temperature, and structure responsive to temperature of said storage space and associated with said vaporization-condensation member for regulating the heat transmitted from said region of high temperature to maintain said storage space substantially at a desired temperature.

2. In a refrigerator having a thermally insulated storage space and absorption refrigeration apparatus including a cooling element arranged to effect cooling of said space and a generator, heating means providing a region of high temperature, a heat transfer system comprising a first member positioned in said region of high temperature, a second member in thermal relation with said generator, and conduit means connecting said members, said members and conduit means forming a closed circuit containing a volatile fluid, means including a thermostat for controlling said heating means to maintain said region substantially at a constant temperature, and a thermostatically operated valve in said circuit for regulating flow of fluid therein responsive to temperature in said storage space.

3. In a refrigerator having a thermally insulated storage space and absorption refrigeration apparatus including a cooling element arranged to effect cooling of said space and a generator, heating means removed from said generator and providing a region of high temperature, a heat transfer system comprising a first member positioned in said region of high temperature, a second member in thermal relation with said generator, and conduit means connecting said members, said members and conduit means forming a circuit containing a volatile fluid, a vaporization-condensation structure adapted to contain a fluid and having a vaporization portion in thermal relation with said circuit and a condenser portion in thermal relation with air in said storage space, means including a thermostat for controlling said heating means to maintain said region of high temperature substantially constant, and means including a thermostat responsive to temperature in said storage space for controlling circulation of fluid in said vaporization-condensation structure.

4. In a refrigerator having a thermally insulated storage space and absorption refrigeration apparatus including a cooling element arranged to effect cooling of said space and a generator, heating means removed from said generator and providing a region of high temperature, a first heat transfer system comprising a first member positioned in said region of high temperature, a second member in thermal relation with said generator, and conduit means connecting said members, said members and conduit means forming a circuit containing a volatile fluid, a second heat transfer system comprising a third member in thermal relation with said first heat transfer system outside said storage space, a fourth member disposed in said storage space, and conduit means connecting said third and fourth members, said third and fourth members and connecting conduit means forming a second closed circuit containing a volatile fluid, means including a thermostat for controlling said heating means to maintain said region of high temperature substantially constant, and a thermostatically operated valve for controlling flow of fluid in said second circuit responsive to temperature in said storage space.

5. A method of heating absorption refrigerating apparatus having a cooling element arranged to effect cooling of a space and a heat receiving part, which consists in transferring heat by an evaporation-condensation system having a heat rejecting portion in heat conductive relation with said part and a heat absorbing portion in heat conductive relation with a continuously burning domestic heat source of approximately constant temperature, and regulating the transfer of heat by said system responsive to the temperature of the space.

6. In combination with heat operated refrigerating apparatus having a cooling element arranged to effect cooling of a space and a heat receiving part, a heat supply system comprising a continuously burning domestic heat source of approximately constant temperature, an evaporator-condenser system in heat conductive repipe 40' into the ash pit 25' and passes through the grate 24' to form the combustion gases. The combustion gases flow upward in a channel 28' and about an oven 51 and are discharged through a conduit 52. The evaporation member 40 of the heat transfer system is disposed within the stove 10' adacent to the oven 51 and is adapted to be heated by the combustion gases flowing upward from the channel 28'. The thermal element 34 of the expansible fluid thermostat controlling the dampers 39 is positioned in the region of and adjacent to the evaporation member 30, whereby the temperature of the combustion gases is maintained substantially constant.

In this embodiment of my invention the temperature of the evaporation member 30 determines the temperature of the condenser 32, and heat is continuously applied to the generator 12 to expel refrigerant out of solution from the absorption liquid, whereby cold is always produced by the cooling unit 13 in the storage space 14. In order to maintain the storage space 14 substantially at a desired low temperature I provide a second vaporization-condensation member associated with the condenser 32 of the heat transfer system to heat the storage space 14 when the latter tends to fall below the desired low temperature. The second vaporization-condensation member comprises an evaporation portion in the form of a coil 53 which is disposed about the upper closed end of the sleeve 33 of the generator 12. The upper end of the coil 53 is connected by a conduit 54 to a condenser portion 55 disposed in the storage space 14 and provided with fins 56 to increase the effective heat transfer surface. The lower part of the condenser 55 is connected by a conduit 57 to an accumulation vessel 58 which in turn is connected to the lower end of the coil 53.

The generator 12 and parts of the vaporization-condensation member just described are preferably embedded in insulation, as shown in Fig. 2, so that the heat applied to the generator 12 at the lower end of the sleeve 33 can be effectively utilized to heat and vaporize fluid in the coil 53. The vapor formed in the coil 53 passes upward through the conduit 54 into the condenser 55 in which it is condensed, and the condensate flows into the accumulation vessel 58 and is returned to the coil 53. The evaporation of liquid in the coil 53 takes up heat from the condenser member 32 and gives up heat in the storage space 14, the fluid serving as a heat transfer agent which circulates naturally in the closed fluid system.

In the conduit 57 is connected a thermostatically operated valve 59 for controlling the flow of condensate from the condenser 55 into the accumulation vessel 58. The valve 59 may be a hermetically sealed valve, similar to the valve 42 in Fig. 1, and controlled by a thermal element 60 of an expansible fluid thermostat. When the storage space 14 tends to rise above a desired low temperature, the thermostatic valve 59 closes whereby the condensate formed in the condenser 55 remains in the latter and does not flow into the accumulation vessel 58 and thence to the coil 53. Vapor continues to flow into the condenser 55 until the coil 53 is depleted of liquid, whereupon the transfer of heat to the storage space 14 terminates. When the storage space 14 tends to fall below the desired low temperature the thermostatic valve 59 opens and permits the flow of liquid into the coil 53 so that transfer of heat will take place from the generator 12 to the enclosed space 14. With such transfer of heat the storage space is not permitted to fall below the desired low temperature.

When the valve 59 is open and liquid can enter coil 53, heat from the condenser 32 flows upward through sleeve 33 to heat and cause vaporization of liquid in the coil 53. Under these conditions coil 53 constitutes a part which is heated by heat of condensation resulting from condensation of fluid in the condenser 32 of the heat transfer circuit. Thus, vaporization of liquid in coil 53 is effected by heat normally available for the heat receiving part or generator 12 of the refrigeration system. Stated another way, whether heat is taken up by coil 53 is dependent upon valve 59 being open, and, when heat is taken up by liquid in coil 53, there is also a change in the rate at which heat is made available to the generator 12 for utilization by the latter. In Fig. 2 the closing and opening of the valve 59 changes the rate at which heat is received by liquid in generator 12, therefore, and this is accomplished without blocking the flow of vapor between the evaporation member 30 and condenser 32.

It will now be understood that the expansible fluid thermostat including the thermal element 34 controls the dampers 39 and regulates the amount of draft in the stove 10 or 10', so that the temperature of the combustion gases utilized as the source of heat will remain substantially constant. No overheating in the stove 10 or 10' can occur, therefore, which would cause the heat transfer system to transmit so much heat that undesirable overheating of the generator 12 would take place. By controlling the temperature of the evaporation member 30, the maximum temperature of the condenser member 32 is determined so that the generator 12 is fully protected from excessive temperatures which would tend to injure parts of the refrigeration apparatus.

Not only are excessive temperatures in the generator 12 avoided by controlling the temperature of the heat source, but the maximum pressure of the vaporized fluid in the heat transfer system is limited. The pressure in the heat transfer system preferably should not exceed seven atmospheres. Since it is desired to maintain the condenser 32 of the heat transfer system at a temperature of about 200° C., it is preferable to employ a liquid in the heat transfer system that condenses at about 200° C. and at a pressure within the limits of from three to seven atmospheres. Among the heat transfer agents which may be used to maintain a temperature of about 200° C. at these pressures are the liquids mentioned above.

In the embodiment illustrated in Fig. 2 the pressure and temperature of fluid in condenser 55 are dependent upon the temperature of cooling element 13. Since the cooling element 13 is at or below freezing temperature during operation of the refrigeration system, it will be apparent that the temperature and pressure in condenser 55 will be considerably below the temperature and pressure existing in the evaporation member 30 and condenser 32 of the heat transfer system. Likewise, when the valve 59 employed is of a type like the valve 42 in Fig. 1, the element 46 therein will also be at a lower temperature and subjected to a lower pressure than the temperature and pressure existing in the evaporation member 30 and condenser 32.

In Fig. 1 the expansible fluid thermostat controlling the valve 42 and including the thermal available to said heat receiving part for utilization by the latter, and means responsive to a temperature condition affected by said cooling element for controlling said last-mentioned structure.

15. A method of transferring heat which consists in heating a first fluid at a place of heating associated with a source of heat, flowing such fluid from the place of heating to a place where heat is rejected to an objective of heating, flowing other fluid external to the path of flow of said first fluid and in heat exchange relation therewith at a region so as to vary the rate at which heat from said source is made available to the objective of heating for utilization by the latter, and controlling flow of said other fluid to said region.

16. A method as set forth in claim 15 in which said other fluid is circulated in a closed circuit by evaporation and condensation, such evaporation being effected at said region.

17. A method as set forth in claim 15 in which both said first fluid and said other fluid are circulated by evaporation and condensation thereof.

18. A method as set forth in claim 15 in which flow of said other fluid to said region is controlled responsive to changes in temperature.

19. A refrigeration system operated by heat and including a cooling element and a heat receiving part, a first member adapted to be heated by a source of heat and a second member arranged to heat said heat receiving part, conduit means connecting said members to form a first circuit in which fluid is adapted to flow from said first member to said second member, a second circuit in which fluid is adapted to flow and having a part arranged to be heated by fluid in said first circuit so as to utilize heat normally available for said heat receiving part to heat fluid in said second circuit, and means to control flow of fluid to said part in said second circuit.

20. The combination defined in claim 19 in which said means to control flow of fluid to said part in said second circuit operates responsive to a temperature condition affected by said cooling element.

21. The combination defined in claim 19 in which said first and second members constitute a vaporizer and condenser, respectively, and fluid is caused to circulate in said first circuit by vaporizing in said vaporizer and condensing in said condenser.

22. The combination defined in claim 19 in which said cooling element is arranged to effect cooling of a space, and said second circuit includes a heat rejecting part in heat exchange relation with said space.

23. A refrigeration system operated by heat and including a cooling element and a heat receiving part, a vaporization member adapted to be heated by a source of heat and a condenser member in thermal relation with said heat receiving part, conduit means connecting said members to form a closed circuit containing a volatile fluid, said conduit means providing a common path of flow for vapor flowing from said vaporization member to said condenser member and for condensate flowing from said condenser member to said vaporization member, and structure associated with said closed circuit to control the rate at which heat from said condenser member is made available to said part for utilization by the latter, said structure being so constructed and arranged that control of the rate at which heat is made available to said part is always effected without blocking the flow of vaporized fluid from said vaporization member to said condenser member.

24. The combination defined in claim 23 and including means responsive to a temperature condition for operating said structure.

PETER KÖHLER.